United States Patent
Asar et al.

(10) Patent No.: US 7,197,557 B1
(45) Date of Patent: *Mar. 27, 2007

(54) METHOD AND SYSTEM FOR EVALUATING QUALITY OF SERVICE FOR STREAMING AUDIO AND VIDEO

(75) Inventors: Adnan Asar, Union City, CA (US); Nicholas Spicer, Sunnyvale, CA (US); Don Aoki, Mountain View, CA (US); Ou-Dan Peng, San Mateo, CA (US); Kent Yee, San Francisco, CA (US); Matthew Parks, Redwood City, CA (US); Ronald Wolf, Palo Alto, CA (US); Umang Gupta, San Mateo, CA (US); Kenny Bright, Fremont, CA (US); Chris Overton, Alameda, CA (US)

(73) Assignee: Keynote Systems, Inc., San Mateo, CA (US)

( * ) Notice: Subject to any disclaimer, the term of this patent is extended or adjusted under 35 U.S.C. 154(b) by 669 days.

This patent is subject to a terminal disclaimer.

(21) Appl. No.: 09/870,127

(22) Filed: May 29, 2001

(51) Int. Cl.
*G06F 15/173* (2006.01)

(52) U.S. Cl. ............... 709/224; 709/231; 709/232; 709/225; 709/226; 707/104.1; 707/103 R (58) Field of Classification Search ........ 709/224–226, 709/231–232, 203, 200, 202, 105, 208, 209, 709/210, 217, 218, 219, 235, 238, 220; 714/4, 714/2; 725/87, 98; 386/95; 707/104.1, 707/103 R
See application file for complete search history.

(56) References Cited

U.S. PATENT DOCUMENTS

| | | | |
|---|---|---|---|
| 5,557,746 A | 9/1996 | Chen et al. ............ 395/200.06 |
| 5,657,450 A | 8/1997 | Rao et al. ................... 395/610 |
| 5,696,701 A | 12/1997 | Burgess et al. ......... 364/551.01 |
| 5,696,965 A | 12/1997 | Dedrick ..................... 395/610 |
| 5,754,772 A | 5/1998 | Leaf ...................... 395/200.33 |
| 5,761,486 A | 6/1998 | Watanabe et al. ........... 395/500 |
| 5,761,663 A | 6/1998 | Lagarde et al. ............... 707/10 |
| 5,774,670 A | 6/1998 | Montulli ............... 395/200.51 |
| 5,790,798 A | 8/1998 | Beckett, II et al. ..... 395/200.54 |
| 5,790,977 A | 8/1998 | Ezekiel ....................... 702/122 |
| 5,796,633 A | 8/1998 | Burgess et al. ......... 364/551.01 |
| 5,796,952 A | 8/1998 | Davis et al. ........... 395/200.54 |
| 5,802,106 A | 9/1998 | Packer ....................... 375/225 |
| 5,805,815 A | 9/1998 | Hill ....................... 395/200.48 |
| 5,890,203 A * | 3/1999 | Aoki .......................... 711/111 |
| 6,006,260 A | 12/1999 | Barrick, Jr. et al. ........ 709/224 |
| 6,138,157 A | 10/2000 | Welter et al. ............... 709/224 |
| 6,157,618 A * | 12/2000 | Boss et al. .................. 709/224 |
| 6,195,680 B1 * | 2/2001 | Goldszmidt et al. ........ 709/203 |
| 6,438,592 B1 * | 8/2002 | Killian ....................... 709/224 |
| 6,449,739 B1 * | 9/2002 | Landan ...................... 709/224 |
| 6,535,220 B2 * | 3/2003 | Deering et al. ............. 345/582 |
| 6,584,153 B1 * | 6/2003 | Gordon et al. ......... 375/240.13 |
| 6,587,878 B1 * | 7/2003 | Merriam ..................... 709/224 |
| 6,647,389 B1 * | 11/2003 | Fitch et al. ................. 709/229 |
| 6,681,232 B1 * | 1/2004 | Sistanizadeh et al. .... 707/104.1 |
| 6,751,673 B2 * | 6/2004 | Shaw ......................... 709/231 |
| 2002/0065922 A1 * | 5/2002 | Shastri ....................... 709/227 |
| 2002/0124098 A1 * | 9/2002 | Shaw ......................... 709/231 |

* cited by examiner

Primary Examiner—Jeffrey Pwu
(74) Attorney, Agent, or Firm—Cindy Kaplan (57) ABSTRACT

A system for measuring performance of streaming media sent from a server over a network. The system includes a data acquisition agent connected to the network and operable to send a request for streaming media to the server. The agent is configured to receive streaming media, collect performance measurements, and send the performance measurements to a storage device.

57 Claims, 10 Drawing Sheets

METHOD AND SYSTEM FOR EVALUATING QUALITY OF SERVICE FOR STREAMING AUDIO AND VIDEO

BACKGROUND OF THE INVENTION

The present invention relates generally to evaluating quality of service provided over a network, and more particularly, to systems and methods for monitoring the quality of steaming audio and video over a network such as the Internet.

With the explosive growth of the Internet, increased traffic has caused the performance experienced by users making connections over the Internet to vary widely. The lower the quality of audio and video downloaded from a Web site, the more likely the user is to go to a competitor's Web site. Thus, it is important for companies to be aware of the quality of audio and video experienced by users at their Internet sites so that they can quickly identify problems, upgrade their equipment, modify the content of their Web site, or otherwise improve the quality of audio and video available to users at their Web site.

Many factors influence the performance of a connection including the user's modem and other equipment, the type of server, the load on the server, and the Internet service provider used. The first step in evaluating connection performance is to obtain reliable information regarding performance characteristics across a connection.

One approach to measuring Web site performance is to connect measurement agents to the Internet at various geographic locations. This approach is described in U.S. patent application Ser. No. 08/868,616, filed Jun. 3, 1997, by Barrick et al. The system disclosed therein uses a browser agent to send an HTTP GET command to a server and then record the amount of time it takes to complete transmission of the data. The agents evaluate the performance of a Web site by measuring the amount of time it takes to download a Web page. Due to their remote location, the agents are able to evaluate the performance of a Web site from the end user's perspective, and are able to measure the effects of the intervening network itself in addition to the performance of the Web server. As a result, the performance seen by an agent can provide a reasonable approximation for the service experienced by customers connecting to the Internet at approximately the same location, and at approximately the same time as the agent.

While this is a useful indicator of server performance for downloading a Web page, it does not provide quality of service measurements for streaming media. There is, therefore, a need for a method and system for simulating a session in which streaming media is broadcast over the network and performance is monitored to identify problem areas and compare performance with other streaming media sites.

SUMMARY OF THE INVENTION

A method for measuring performance of streaming media over a network generally comprises connecting a data acquisition agent to the network and sending a request for streaming media from the data acquisition agent to a media source connected to the network. Streaming media is received in response to the request for media at the data acquisition agent. Performance measurements are collected for the streaming media and sent to a storage device.

In another aspect of the invention, a computer program product for measuring streaming media over a network generally comprises computer code that connects a data acquisition agent to the network, computer code that sends a request for streaming media from the data acquisition agent to a media source connected to the network, and computer code that receives streaming media in response to the request for media at the data acquisition agent. The product further includes computer code that collects performance measurements for the streaming media and a computer readable medium that stores the computer codes.

In yet another aspect of the invention, a system for measuring performance of streaming media sent from a server over a network generally includes a data acquisition agent connected to the network and operable to send a request for streaming media to the server. The agent is configured to receive streaming media, collect performance measurements, and send the performance measurements to a storage device.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWING

Corresponding reference characters indicate corresponding parts throughout the several views of the drawings.

DETAILED DESCRIPTION OF THE PREFERRED EMBODIMENT

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
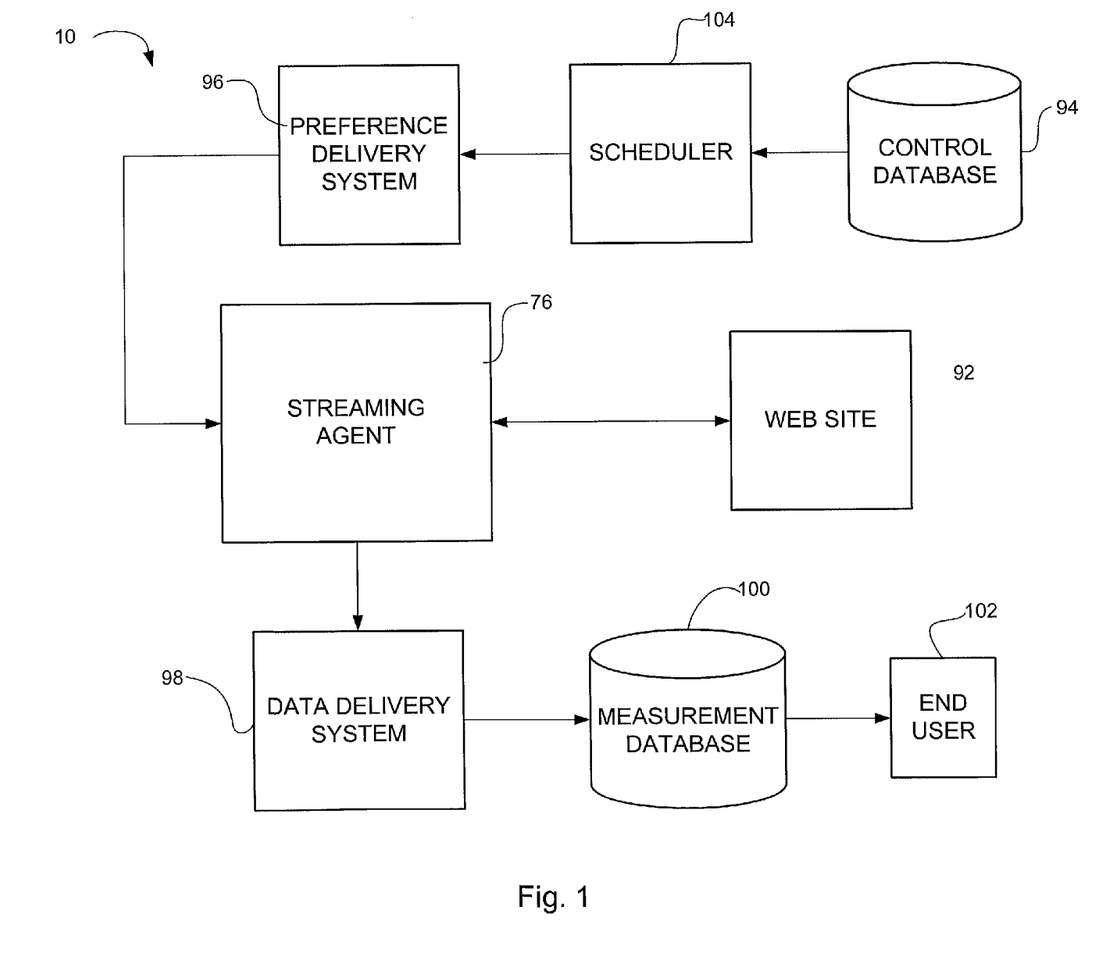
FIG. 1 is a block diagram of a system of the present invention for monitoring performance of streaming media over a network.

Referring now to the drawings, and first to FIG. 1, a system for monitoring performance of streaming media is shown and generally indicated at 10. The system is used to measure the performance, quality, and availability of streaming media sites (audio and video) over a network, such as the Internet. The system may be used, for example, by Internet broadcasters, content producers, and Web site operators to measure, compare, diagnose, and improve streaming quality on the Internet. The system may be used to measure performance of streaming media on radio stations, video broadcasts, online music stores, and other server hosting facilities for streaming services. The system may also be used to measure performance for event-based performances, where companies broadcast audio and video events over the Internet for a limited period of time. The system may be used to detect problems such as content problems, Web server problems, back end system problems, backbone problems, network problems, or combinations thereof. Also, the geographic distribution of agents as described below, allows for the identification of problems based on location.

Figure 2:
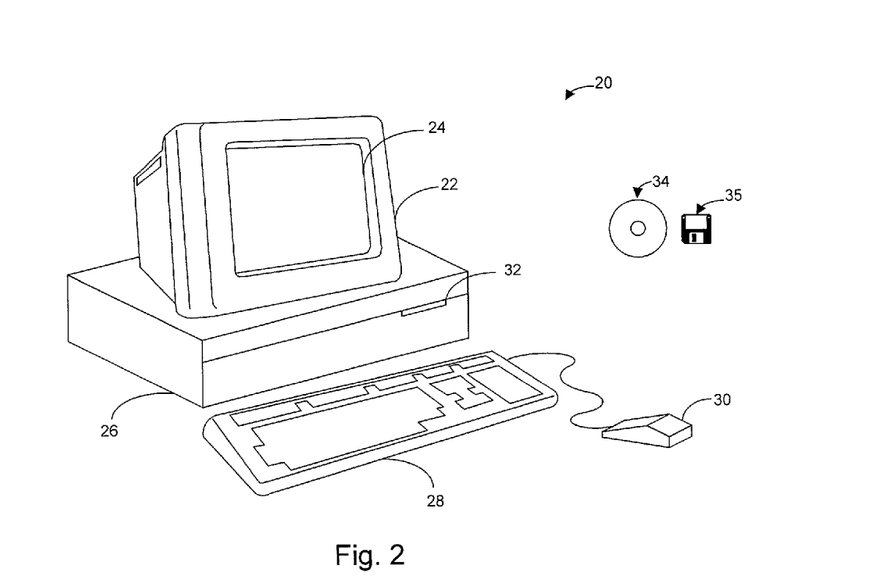
FIG. 2 is a schematic illustrating an example of a computer system that can be utilized to execute software of an embodiment of the invention.

FIG. 2 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 3) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive can be utilized.

Figure 3:
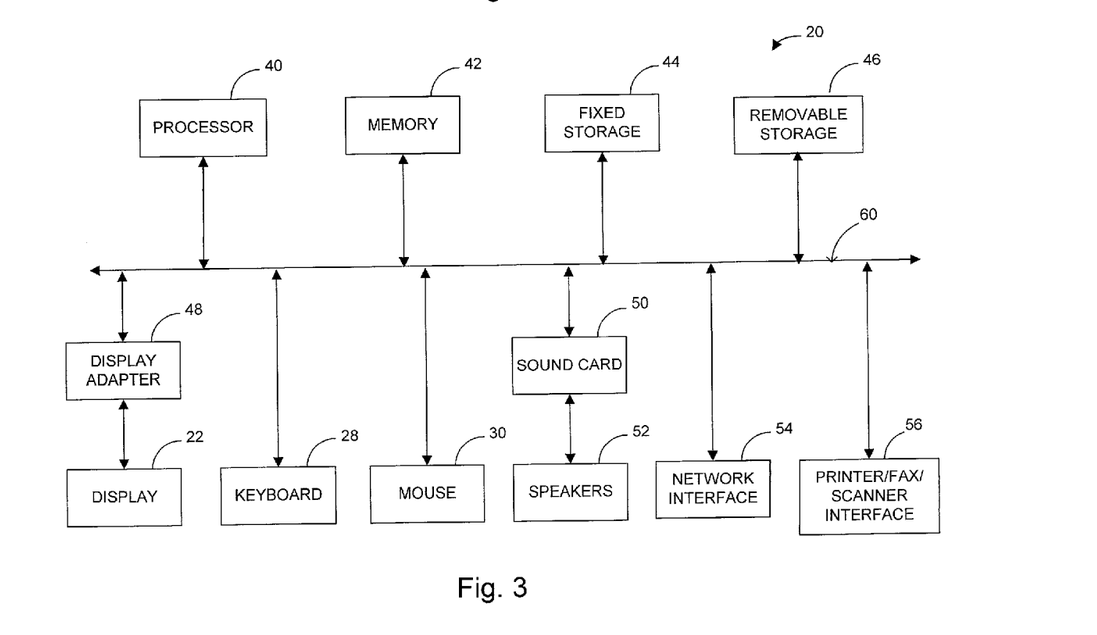
FIG. 3 is a system block diagram of the computer system of FIG. 2.

FIG. 3 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 3. However, these arrows are only illustrative of one possible interconnection scheme serving to link the subsystems. For example, a local bus could be utilized to connect the central processor 40 to the system memory 42 and display adapter 48. Computer system 20 shown in FIGS. 2 and 3 is but an example of a computer system suitable for use with the invention. Other computer architectures having different configurations of subsystems may also be utilized. For example, the agent computer systems described herein typically do not include a display 22, screen 24, keyboard 28, or mouse 30.

Figure 4:
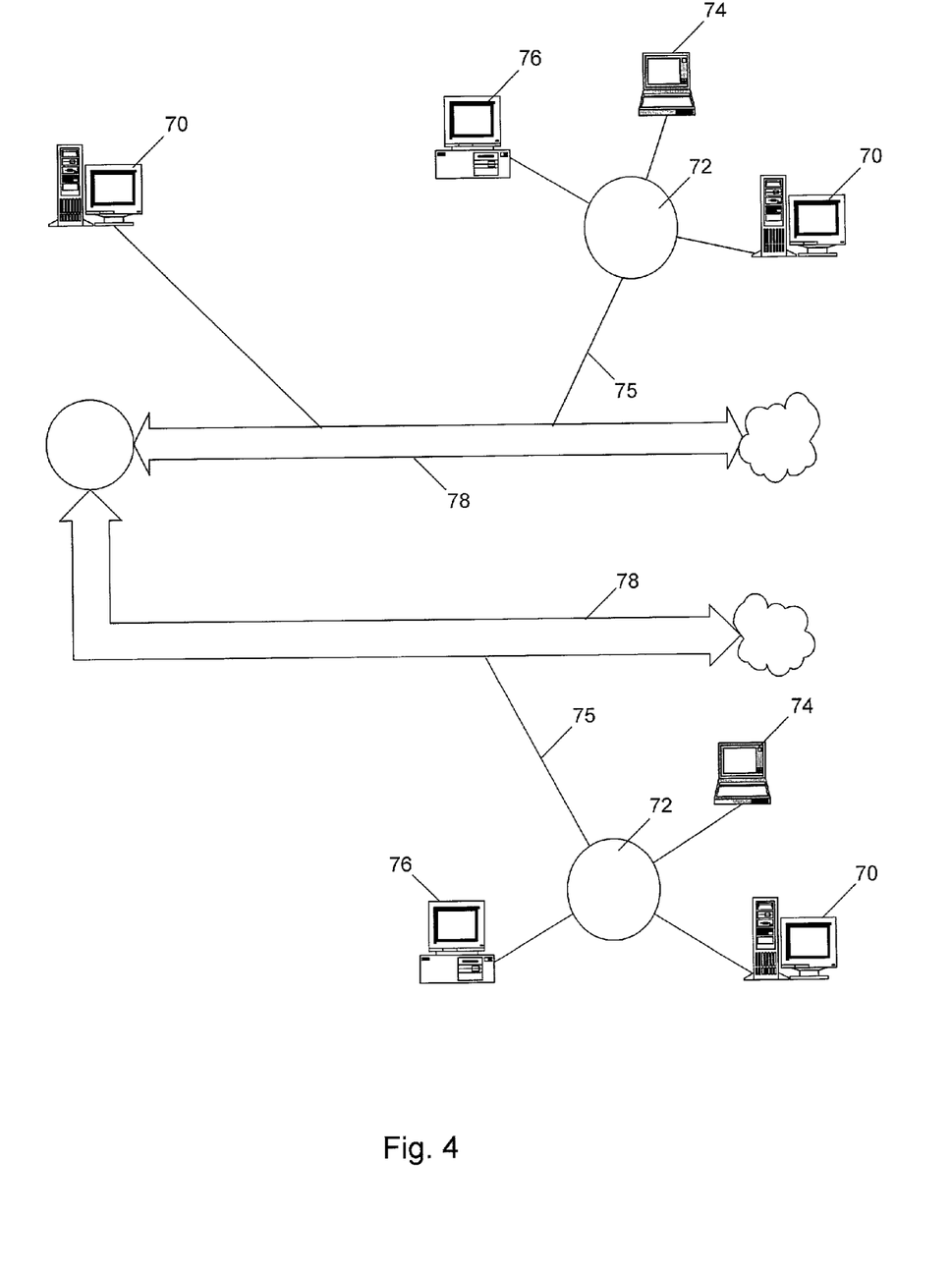
FIG. 4 is a schematic illustrating components within a network on which performance data can be collected in accordance with the present invention.

As shown in FIG. 4, the system 10 may be used to collect performance data on a network. In one embodiment, the network is the Internet and the information is transmitted in the form of Web pages and streaming media. FIG. 4 illustrates the interconnection between components within the network. The network includes one or more servers 70 for hosting one or more network sites. The servers 70 are typically connected to the network at points of presence (POPs) 72, established by network service providers at a variety of geographic locations. Also connected to the network via POPs 72 are multiple users 74 and data acquisition agents 76. Transmission medium such as T1 and T3 lines, dial-up, DSL (Digital Subscriber Line), cable connections, or wireless transmission may provide interconnections between the components within the network. A given geographic location, such as a metropolitan area, will typically contain multiple POPs 72 established by different network service providers. Each POP 72 may supply Internet connections to one or more users 74, servers 70, and agents 76. As illustrated in FIG. 4, the POPs 72 may be connected directly to an Internet backbone 78 via a relatively high-speed transmission medium 75 such as a T1 line. The connection between POPs 72, users 74, servers 70, and agents 76 may include any suitable transmission media, including, but not limited to, public telephone lines, T1 lines, T3 lines, and Ethernet connections.

The agents 76 may comprise Windows NT computers which are connected directly to POPs 72 at facilities throughout the network, for example. The agents 76 preferably include a processor and memory, which may include high speed random-access memory (RAM) and non-volatile-storage such as a magnetic disk and read only memory (ROM). It will be understood that the agents 76 may comprise any suitable device and may be located at various geographic locations, without departing from the scope of the invention. The agents may run on any type of Internet connection, such as T1 lines, dial-up, DSL, 56 Kb, or cable modem, for example. The agent preferably uses an Internet browser such as Internet Explorer.

It is to be understood that the network configuration and interconnections shown in FIG. 4 and described herein, are provided for purposes of illustration only. One of ordinary skill in the art will readily appreciate that the present invention may be practiced on networks more or less complex than that shown, in accordance with the teachings contained herein.

Referring again to FIG. 1, the system 10 generally includes one or more streaming agents 76 which are used to request streaming data from a server 92 (such as a server hosting a Web site containing streaming media), a control database 94 containing a list of sites to be monitored, a preference delivery system 96 for sending the list of sites to the agents, and a data delivery system 98 for delivering performance data collected by the agents to a measurement database 100. Each agent 76 sends performance information gathered during monitoring of the streaming media to the data delivery system 98 located within a data collection server. The data delivery system 98 then transfers the performance data to the measurement database 100. The measurement database 100 provides data to the end user 102 in the form of e-mail or posts the data on a Web site, for example. The measurement database 100 is preferably contained within a database server that is located at a performance monitoring service center.

The agents 76 are configured to receive commands from one or more external servers, automatically obtain Web performance measurements, and send data to one or more databases and servers. The agent 76 may run, for example, Windows NT and a software agent such as one built based upon the Real Media Player available from RealNetworks of Seattle, Wash. or Windows Media available from Microsoft. The agents 76 repeatedly access the Web site 92, making repeated measurements and sending multiple reports to the data collection server. The agents 76 communicate the performance data that they have collected to the server via network connections and may forward the data to the server as soon as the data has been gathered, temporarily store the data before forwarding it to the server, or communicate data to the server in some other manner. The data delivery system 98 receives the performance data sent by the agents 76 and stores the data in one or more of the measurement databases 100. The data delivery system 98 may pre-process some or all of the data before storing it in the database 100, or it may simply pass the data on to the database directly. As further described below, end users 102 may query the database 100 to request performance parameters for a particular Web site 92.

A scheduler (booking server) 104 is located between the monitoring database 94 and the preference delivery system 96. The scheduler 104 receives data from the database 94 and computes a schedule based on measurement interval, start time, and end time for each target streaming clip. The scheduler 104 may read from a schedule bucket that includes fields for agent ID, target ID, and starting minute. If a new target is added, the starting minute will initially be set to null. The scheduler 104 schedules the task based on its measurement interval, start time, and end time, and the current load on the agent being scheduled. Once the scheduler 104 determines the correct starting minute, it inserts the value into the starting minute field of the bucket table. The scheduler 104 may schedule tasks based on a specific time that a broadcast will occur or the tasks may be scheduled to occur any time within an hour. The scheduler 104 can also determine if one of the agents 76 is overbooked and notify an operations center. If required, the scheduler 104 can spread measurements across the agents 76 measuring a target so that all agents do not measure the target at the same time. The scheduler 104 is preferably configured to schedule the same target across all agents randomly. The scheduler 104 may be configured to schedule tasks on the minute, with global timeout values set to a few seconds less than the measurement duration so that consecutive measurements do not run into one another. It is to be understood that other types of scheduling systems may be used without departing from the scope of the invention.

Figure 5:
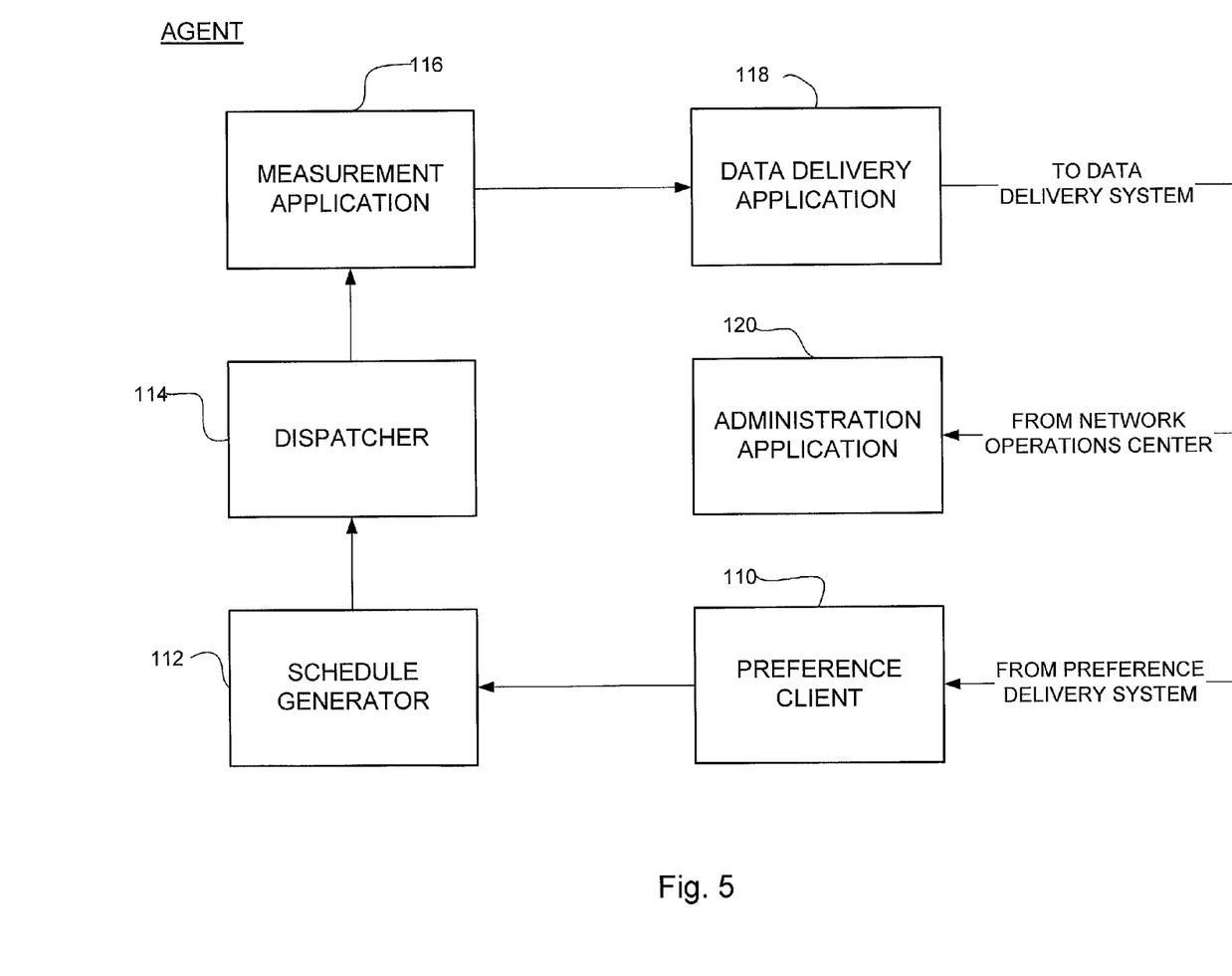
FIG. 5 is a block diagram illustrating additional detail of an agent of the system of FIG. 1.

FIG. 5 illustrates applications that reside on the agent 76. A preference client 110 gets preference files from the preference delivery system 96 and saves the files on the agent 76. The preference files include a list of measurement targets (e.g., URLs (Uniform Resource Locators)) assigned to the agent 76 and associated configuration parameters. The preference file may include, for example, a target ID, URL of clip to be measured, playback time, timeout for connect and redirect time, buffer timeout, playback timeout, maximum number of redirects, performance measurements, maximum bandwidth, start time, and end time. The preference client 110 creates a new target preference file if the target preference file does not already exist on the agent 76, updates the file if the file exists, or deletes the file if the preference server 96 stops providing preferences for the target. The preference client 110 preferably sends HTTP (Hypertext Transfer Protocol) requests to the preference delivery system 96 to obtain agent preferences and target schedule preferences.

The preference client 110 translates the raw target data into a measurement schedule which is then sent to the schedule generator 112. For example, the preference client 110 may send the following information to the schedule generator 112:

Playback Time: total time to play clip;
Connection and Redirection Timeout: timeout value for initial connection and redirection;
Buffer Timeout: timeout value of the initial buffering in seconds;
Max Redirection: maximum allowable number of redirections;
Global Timeout: global measurement time value in seconds;
Target ID: target ID of the target clip;
Seek Offset: offset from the start of clip to the start of playing the clip;
Realtime Flag: 1=send measurements at regular intervals, 0=do not send continuous data;
Realtime Interval: Interval at which real time data is to be reported;
Streamfile Type: File type in case a specified stream needs to be measured (0=auto; 1=RealVideo, 2=MP3);
Stream Sequence: Sequence of the stream for the file type specified in Streamfile Type;
Conf File: full path of the configuration file;
URL (e.g., http://www.___).

The schedule generator 112 reads the preference file and generates a schedule of when measurements should occur based on preferences in the target preferences file and schedule data generated by the scheduler 104. The time parameters are preferably in GMT format and account for daylight savings. This allows agents located at different geographic locations to monitor a site at the same time. The schedule generator 112 sends a schedule file to dispatcher 114, which reads the schedule file and starts measurements by invoking a measurement application 116. The measurement application 116 includes standard APIs (Application Program Interfaces) that allow for media clips to be played, stopped, paused, moved forward and backward, and for the collection performance measurements. Measurements may be taken on one or more days or all weekdays, for example. The measurements may be performed all day or only during select times. The measurements may be performed from one to six times an hour, and the streaming data may be monitored for one to sixty minutes, for example.

While the clip is played, performance data is collected and stored in a data file. The data file may include a trace log file that provides information on exactly what the agent 76 was doing continuously during the measurement. The trace file is preferably used only for debugging purposes. An error log saves any errors that occur if a measurement was not taken successfully. Successful measurements that include errors are sent to a data log file. The error log file includes errors for measurements that were not completed, such as when the agent 76 hangs up.

The data delivery application 118 delivers the measurements using HTTP, for example, to the data delivery system 98 which stores the data in the database 100 (FIGS. 1 and 5). The agent 76 sends the measurements only after it has finished playing the entire clip. The agent 76 first writes the measurements to a log file on its hard drive. It then attempts to deliver the data file to the data delivery system 98. The data file is deleted once the data has been successfully delivered.

The agent 76 also includes an administration application 120 which runs in the background and communicates with a network operations center. The network operations center sends agent configuration changes to the administration application 120 and the administration application sends agent information to the network operations center so that the operations center can monitor the agents 76.

Figure 6:
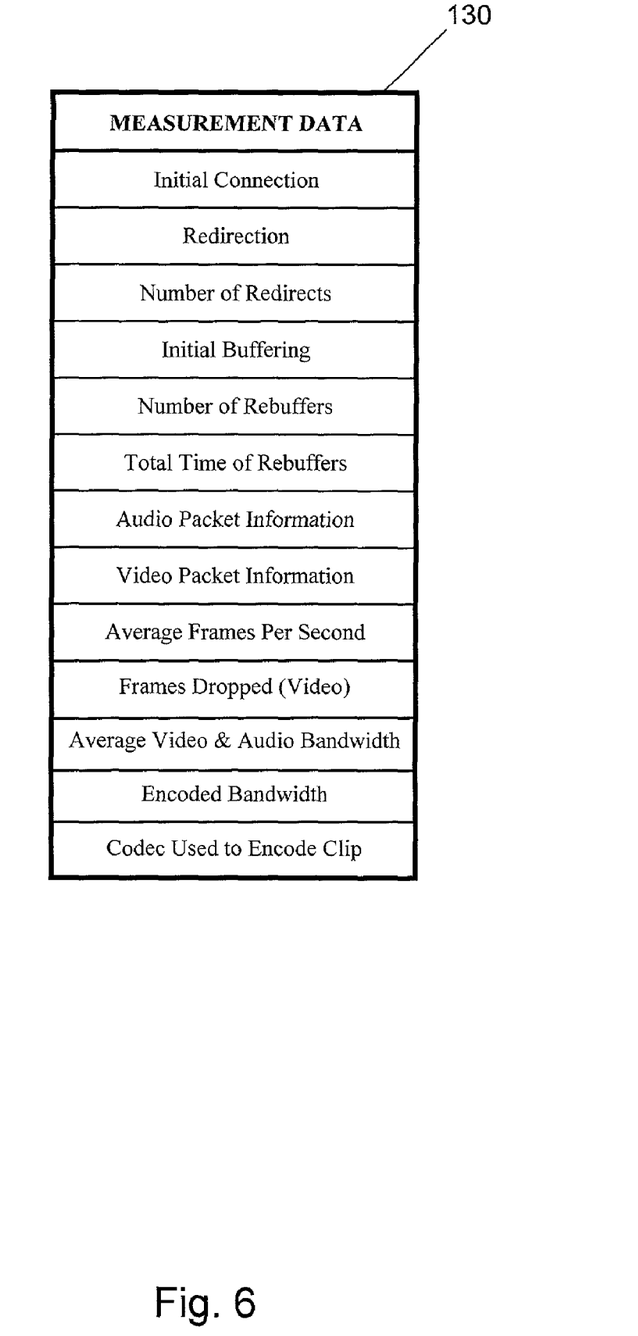
FIG. 6 is a table listing exemplary quality monitors.

The system 10 may monitor a number of performance measurements. FIG. 6 shows a table 130 listing some of the measurements that may be taken and recorded by the system 10. Measurements may include initial connection time, which is the time it takes to establish RTSP (Real Time Streaming Protocol) connection between the streaming server and the streaming client (i.e., the length of time between pressing the play button and receiving the first bytes of streaming media), redirection time (time it takes to transfer data from one server to the next in the case where one server redirects the data to a second server), number of redirects (the number of times the media is redirected to another server), initial buffering (time required to start viewing or listening to a streaming media clip from the time data begins to arrive in the buffer), number of rebuffers (number of times streaming data is stopped and started due to data arriving too slowly in the buffer), total time of rebuffers (total time the data is stopped due to rebuffer), and other audio or video packet information (e.g., number of late, lost, and dropped packets).

Figure 7:
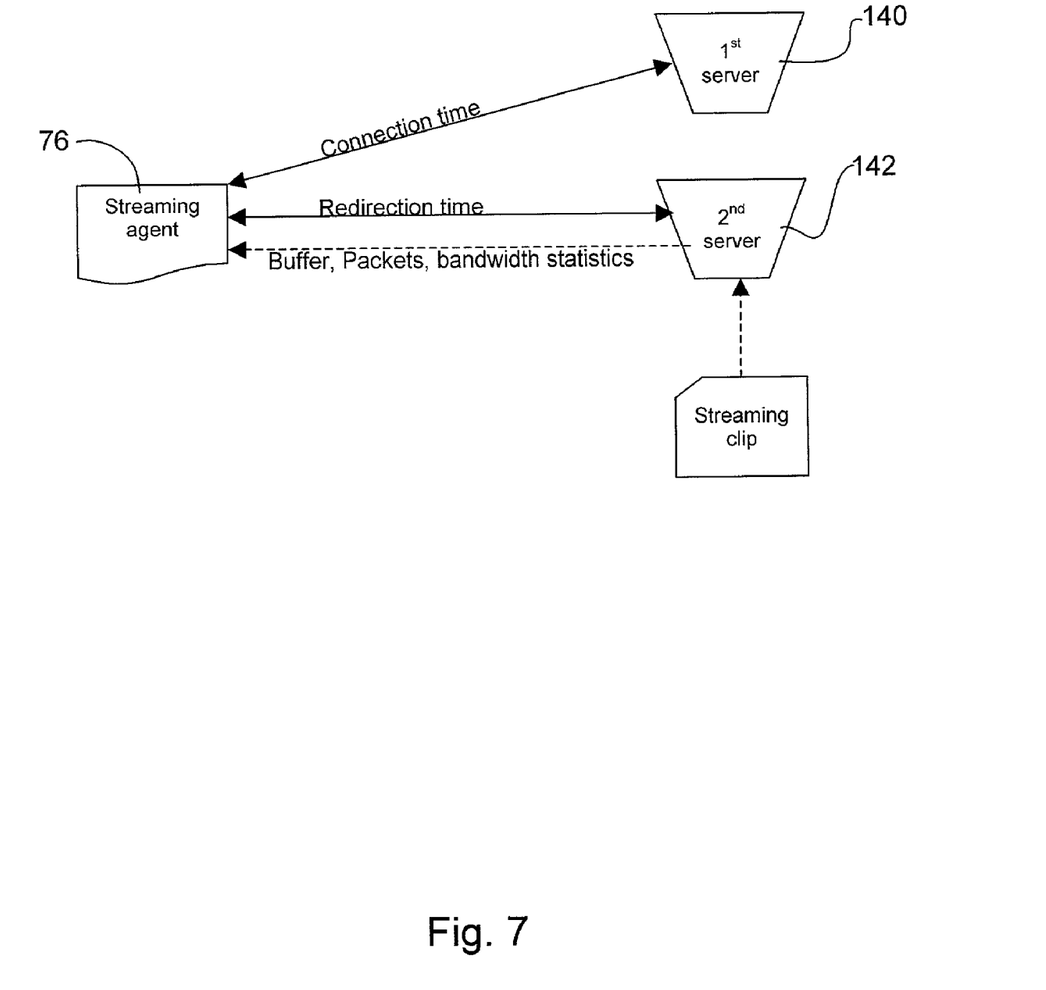
FIG. 7 is a schematic illustrating measurement of connection time to a first server and redirection time to a second server.

FIG. 7 illustrates connection time and redirection time between the streaming agent 76 and two servers 140, 142. The agent 76 first contacts server 140. The time it takes to establish connection with server 140 is recorded as the connection time. Server 140 may then redirect to server 142. The second server 142 may then connect to a third server (not shown) and this can continue up to the allowed number of redirects. The time it takes to go from the first server 140 to the last server 142 is recorded as redirection time. The number of servers passed through during redirection is also recorded.

Figure 8:
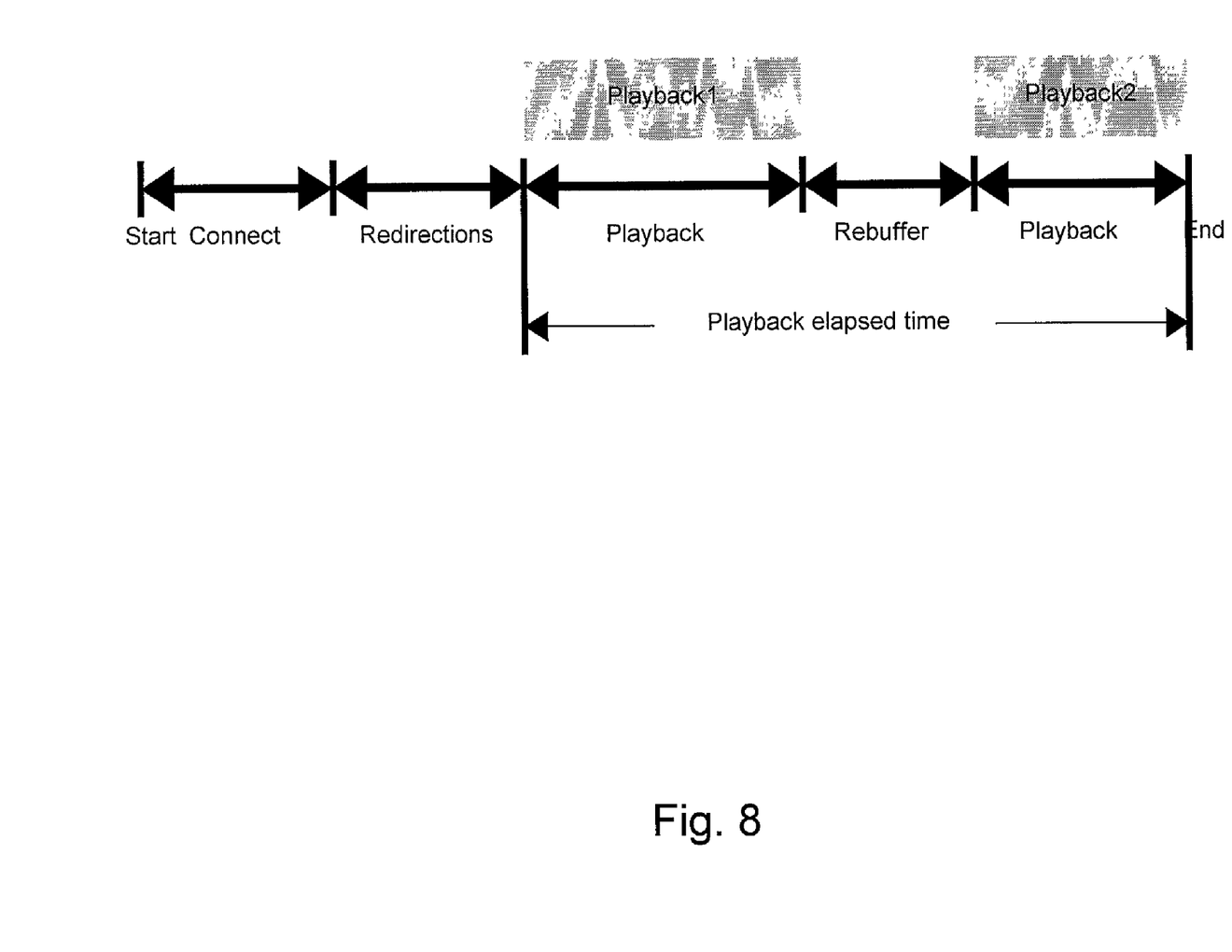
FIG. 8 is a timeline illustrating time related performance measurements of the table of FIG. 6.

A timeline illustrating time related performance measurements is shown in FIG. 8. The connect and redirect times are measured as described above. Clip playback time is equal to Playback 1+Playback 2 and is the actual time that the clip was played. The Playback elapsed time includes any rebuffering that occurs during playback. The Playback elapsed time minus the Clip playback time provides the length of time that was spent rebuffering. The number of rebuffers that occur during playback are recorded.

Additional performance measurements include the average frames per second or frames dropped for video, average video and audio bandwidth, codec used (e.g., Windows Media, Real Media, MP3, QuickTime), encoding rate, encoded bandwidth (e.g., 10 kpbs, 150 kbps), and codec used to encode clip (e.g., Real G2, MP3). The average frames per second indicates the average number of video frames received by agent 76. Average audio and video bandwidth refer to the negotiation that occurs between the streaming site and the agent computer to minimize packet loss. It is to be understood that different measurements may be obtained and the data may be recorded in different formats. For example, the initial connection, redirection, and initial buffering times may all be grouped together and presented as a startup time.

Figure 9:
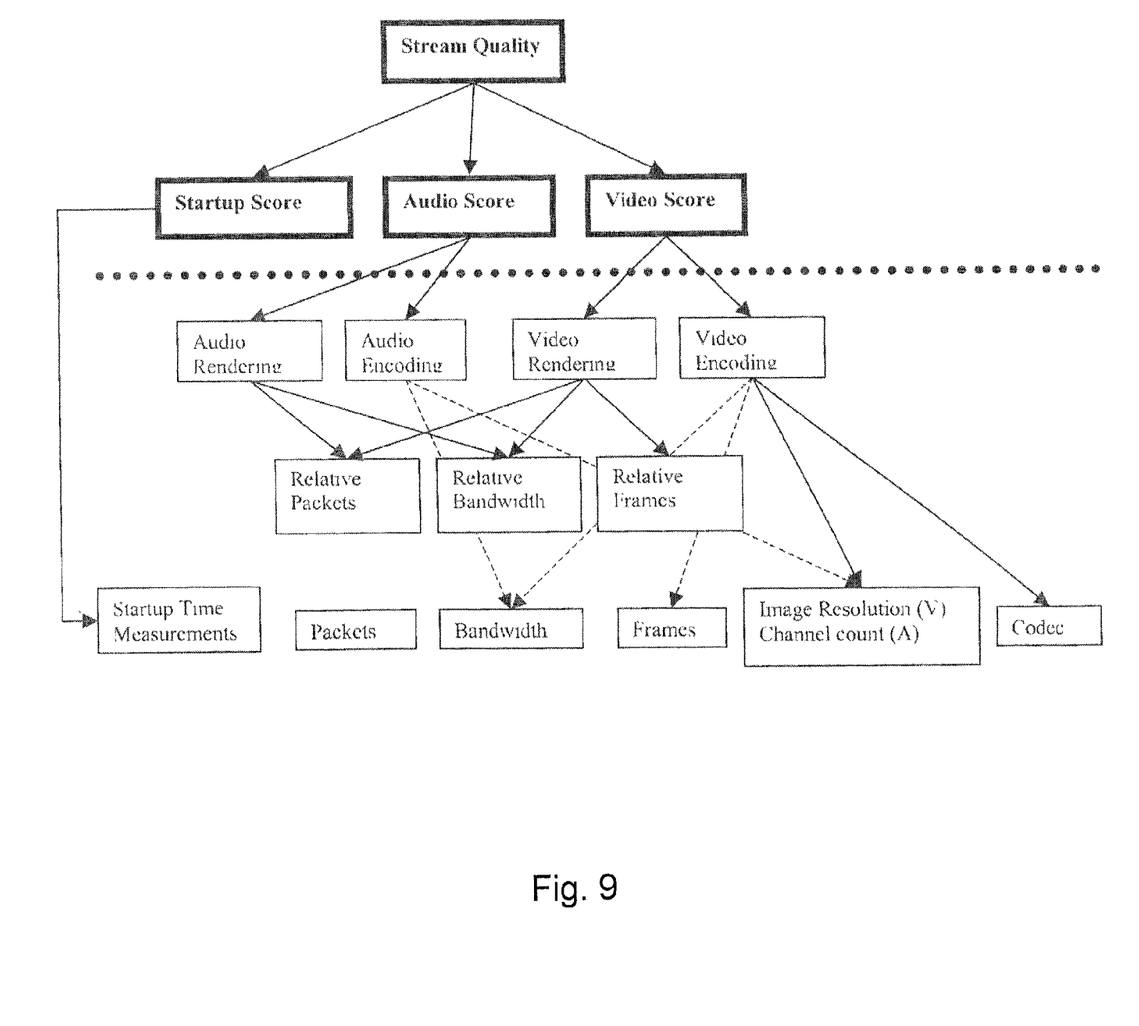
FIG. 9 is a diagram illustrating a rating system for assessing the quality of audio and video streams broadcast over a network.

The performance measurements may be used to calculate an overall rating factor. For example, overall streaming quality may be measured as a combination of startup time, audio delivery quality, video delivery quality, and encoding factors. The overall rating may be provided on a scale of 0 to 10, with 10 being the highest rating. FIG. 9 is a diagram showing intermediate scores (startup score, audio score, and video score) which may be used to calculate the stream quality score. Also shown are individual parameters that contribute to the intermediate scores. The stream quality captures the quality of the performance in a single number and may be, for example, a combination of 20% startup score, 40% audio score, and 40% video score. The startup score rates the total initial delay experienced by the streaming agent 76 prior to the beginning of clip streaming. The score takes into account initial connection time, redirect time, redirect count, and initial buffering time. Startup score is inversely proportional to startup time. Audio score rates the audio portion of the media clip and video score rates the video portion of the media clip. They both take into account encoding factors as well as delivery and rendering factors.

A rendering score rates the performance of the server, Internet connection, and client at reproducing the clip at a client machine. This score rates what is received relative to what is sent. Individual rendering scores are calculated for audio and video. The video rendering score is obtained by averaging relative bandwidth, packets, and frames. The audio rendering score is obtained by averaging relative bandwidth and packets. User experience may be used to obtain baseline scores.

An encoding score rates the quality of the media clip for which streaming is attempted. This score rates what a media server tries to send and is calculated individually for audio and video. Various delivery problems such as a slow startup time, rebuffers, lost packets, or lack of adequate bandwidth cause the audio and video scores to be reduced. The audio encoding score is obtained by multiplying a function that increases from 0 to 1 in bandwidth per channel by a penalty factor determined by the number of channels. The penalty factor for channel count is based upon comparison to the current state of the art in audio for surround sound (i.e., five channels). The channel count penalty factor takes into account the fact that distribution of given bandwidth over multiple channels lessens the bandwidth (and hence the encoding metric) per channel. Video encoding results from a function that ramps up in encoded frame rate times a function that ramps up in bandwidth.

A relative bandwidth score is based on observance of rapid establishment and maintenance of a healthy buffer of incoming packets and the ability to stream encoded bandwidth. A healthy buffer establishment is associated with a high ratio of maximum bandwidth to encoded bandwidth. A server typically provides relatively high bandwidth at the client in order to minimize initial buffering time and startup time. Thus, this effect is measured mainly through the startup time. Bandwidth may not be able to keep up with requirements, thus leading to a high probability of rebuffering. Since rebuffering often takes over a minute to occur, the score is reduced for a bandwidth limitation that leads to rebuffering. The ability to stream encoded bandwidth factor compares the averages of current bandwidth over measured time intervals with encoded bandwidth.

Some of the characteristics captured by the relative packet score are the differing effects of a given packet loss fraction for different media (audio vs. video) and for different encoded bandwidths (the same packet loss fraction damages a highly compressed stream much more). The relative packet scores for audio and video take these phenomena into account by weighing the different kinds of packet counts.

The relative frame score takes into account the fact that all frames are not the same. For example, I-frames are built from encoded information that does not depend on either previous or later frames. Phenomena that are measurable for agents 76 include the increasing damage caused by a given percentage of missing frames for streams with lower encoded frame rates, which have a greater likelihood of higher motion between frames and also a higher likelihood of tighter compression.

Some performance measurements are reported by the media player. For example, RealPlayer reports counts of different types of packets (normal (i.e., arrive first time around), recovered, late, lost). In addition to packet information, RealPlayer measures incoming information by total bits received per unit time (bandwidth) and provides several bandwidth statistics. RealPlayer also reports additional encoding information, such as the codec used and the number of audio channels.

It is to be understood that the scoring system described above is only one example of a method for summarizing performance measurements obtained for streaming media. Other scoring or ranking systems may be used without departing from the scope of the invention. Furthermore, the percentages and weighing factors for the parameters may also be different than described herein.

The data collected by the agents 76 may be viewed on a Web site, for example. The data may also be sent via e-mail, pager alerts, or FTP/raw data updates. The raw data can be stored on the user's computer and analyzed using their own software analysis tools. A user may go to a Web site that displays reports about their streaming media Web sites and other sites of interest in graphical and chart format. The reports may include data related to stream quality, startup score, video score, audio score, average frames per second, audio and video packet loss, audio and video bandwidth, number of redirects, number of rebuffers, and total time of rebuffers, for example. The reports may be based on, for example, time or location of agent. A user may specify a list of sites for which performance data is desired by inputting a target ID. The user may also specify the type of performance data that is desired.

Figure 10:
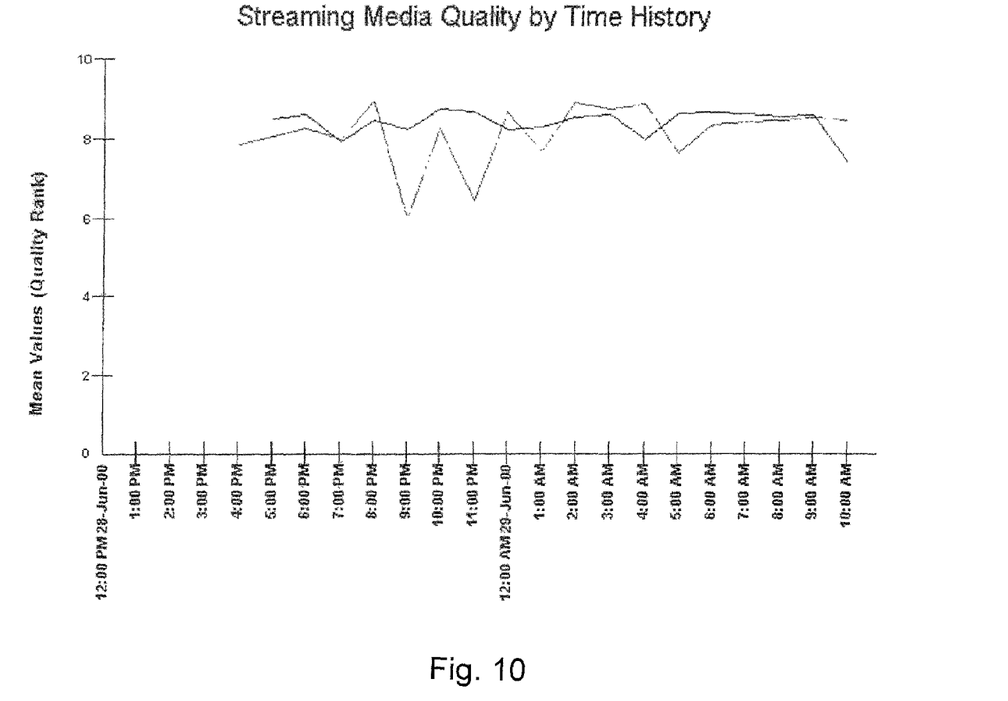
FIG. 10 is a graph illustrating streaming media quality versus time.
Figure 11:
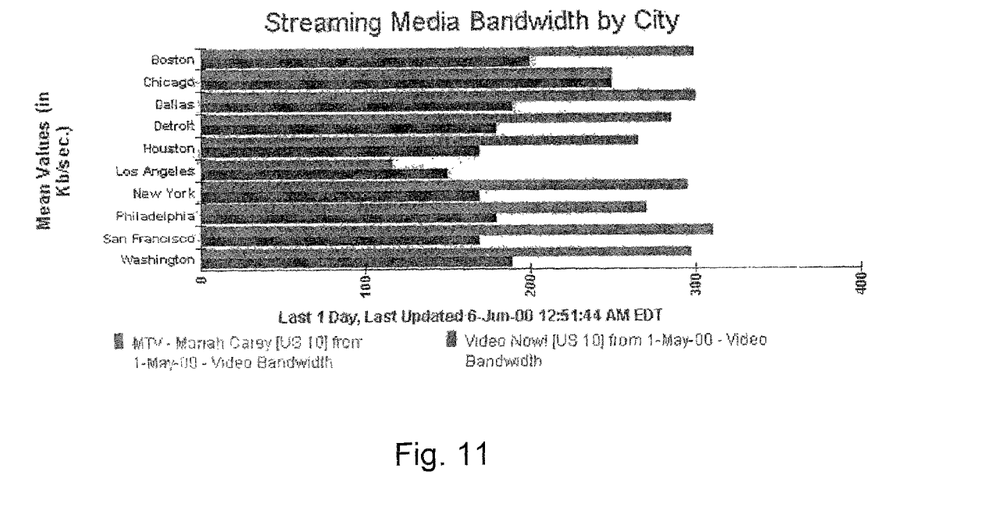
FIG. 11 is a bar chart illustrating streaming media bandwidth at various locations.

FIGS. 10 and 11 illustrate different ways of displaying performance data to a user. FIG. 10 shows a graph wherein streaming media quality experienced at a Web site is plotted versus time. As shown in FIG. 10, the performance of a specific streaming media Web site may be plotted over a period of time at specific intervals (e.g., 1 hour). A graph of other Web sites, such as a competitor's Web site may also be plotted on the same graph to compare performance of Web sites. FIG. 11 is a bar graph showing the streaming media bandwidth experienced by users at different geographic locations. Additional details may also be viewed for transactions at one or more of the locations to identify problems at a specific location. Each bar represents the bandwidth that users in a particular city experienced. A similar chart may be provided with various networks (e.g., GTE, AT&T, Sprint) shown on the horizontal axis rather than the location. FIGS. 10 and 11 are merely illustrative of several preferred ways of displaying data collected in accordance with the principles of the present invention, and many other display formats may be used.

The system 10 may also include an alarm which automatically alerts the owner of a Web site when the Web site becomes unavailable to customers, due to problems with the server, the Internet link being down, or problems with a network provider. An alarm may be triggered based on, for example, streaming Web sites not being accessible from one or more cities, streaming quality, audio delivery quality, video delivery quality, frames per second, packet loss, bandwidth degradation, or user defined errors reported by measurement agents 76. Once an alarm is set, the system 10 may be used to determine if the problem is with the Internet, network provider, link to the Internet, Web server, or Web content. The alarm may be sent to a Web page owner by e-mail or pager, for example. Different alarm levels may be set for one Web site and sent to more than one person concerned about different aspects of the Web site.

A periodic performance report may also be provided which includes quantitative and qualitative data related to a customer's streaming media Web site, including startup time, audio quality, video quality, and overall streaming quality.

Figure 12:
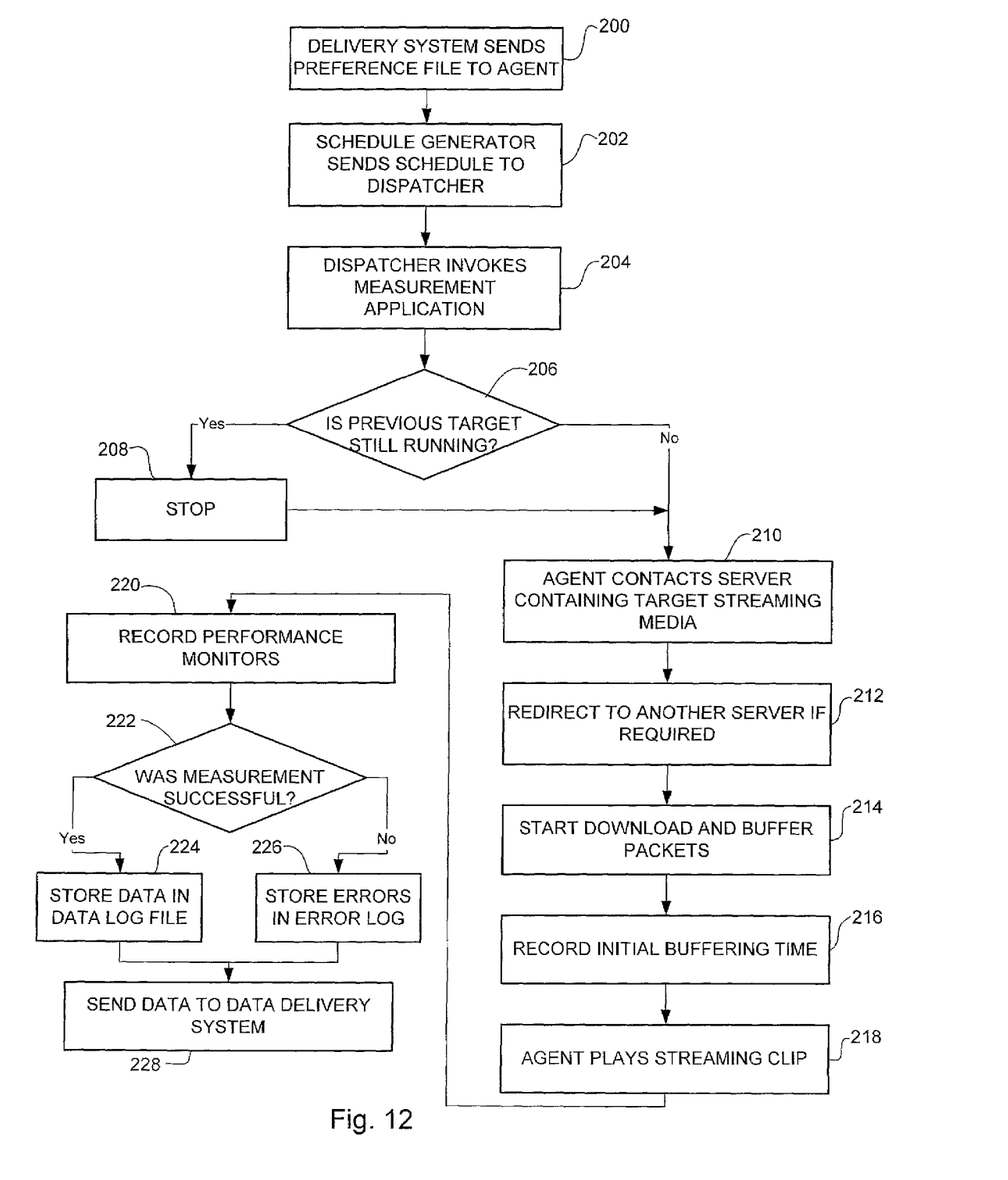
FIG. 12 is a flowchart illustrating a process for measuring performance of a streaming media Web site.

FIG. 12 is a flowchart illustrating a process for measuring performance of streaming media over a network. At step 200 the preference delivery system 96 sends preference files to the agent 76 (FIGS. 1 and 12). The schedule generator 112 generates a schedule for the agent and sends the schedule to the dispatcher 114 (step 202) (FIGS. 5 and 12). The dispatcher 114 invokes the measurement application (step 204). The agent first checks to see if a previous target is still running (step 206). If it is running beyond its allotted time, it is stopped (step 208). The agent 76 then contacts the first server identified by the URL (step 210). The first server may redirect to a subsequent server if required (step 212). Once a connection with the final server is established, the streaming agent 76 starts to download the initial set of streaming packets and begins to buffer them prior to playing the streaming clip (step 214). The buffering time and size varies based on the media player's default configuration and the codec at which the clip was compressed. The time it takes to perform the initial buffering is recorded (step 216). Once the initial buffering is completed, the agent 76 starts to play the streaming clip (step 218). During playback, statistics about the packets and bandwidth are recorded, as previously described (step 220). The data is saved in the data log file if the measurement was successful (steps 222 and 224). If the measurement was not taken successfully the error log will save any errors that occurred (steps 222 and 226). The data is delivered to the data delivery system 98 by the data delivery application 118 and the data log file is deleted from the agent 76 once the data is successfully delivered.

A method and system for evaluating performance of streaming media over the Internet has been disclosed. The method disclosed may also be applied to other network computing environments, including public or private Internets or Intranets.

Although the present invention has been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method of measuring performance of streaming media over a network, the method comprising:
   connecting a data acquisition agent to the network;
   receiving a list of measurement targets, associated configuration parameters, and schedule at the data acquisition agent;
   sending a request for streaming media, based on the received list of measurement targets and schedule, from the data acquisition agent to a media source identified as one of the measurement targets connected to the network;
   receiving streaming media from the measurement target in response to the request for media at the data acquisition agent;
   monitoring the received streaming media;

collecting performance measurements based on the received streaming media, said performance measurements comprising initial connection and redirection times; and sending the collected performance measurements to a data collection server configured for collecting and storing data received from a plurality of data acquisition agents.

2. The method of claim 1 wherein receiving streaming media comprises receiving streaming audio.

3. The method of claim 1 wherein receiving streaming media comprises receiving streaming video.

4. The method of claim 1 wherein receiving streaming media comprises receiving streaming audio and video.

5. The method of claim 1 wherein collecting performance measurements comprises collecting number of redirects.

6. The method of claim 1 wherein collecting performance measurements comprises collecting packet information.

7. The method of claim 1 wherein collecting performance measurements comprises collecting rebuffer information.

8. The method of claim 1 wherein collecting performance measurements comprises collecting frame information.

9. The method of claim 1 wherein collecting performance measurements comprises collecting bandwidth information.

10. The method of claim 1 wherein collecting performance measurements comprises identifying the codec used to encode a clip.

11. The method of claim 1 wherein collecting performance measurements comprises identifying errors.

12. The method of claim 1 wherein the network is the Internet.

13. The method of claim 12 wherein the media source is a Web server.

14. The method of claim 1 wherein connecting a data acquisition agent to the network comprises connecting a plurality of data acquisition agents to the network at a plurality of locations.

15. The method of claim 14 wherein each of the data acquisition agents include an internal clock coordinated with the other data acquisition agent clocks.

16. The method of claim 1 further comprising displaying the performance measurements on a Web site.

17. The method of claim 1 further comprising determining a stream quality rating based on the collected performance measurements.

18. The method of claim 1 wherein collecting performance measurements comprises collecting measurements for a predetermined period of time.

19. The method of claim 1 wherein collecting performance measurements comprises collecting measurements at predetermined intervals.

20. The method of claim 1 wherein collecting performance measurements comprises collecting measurements at specified times.

21. The method of claim 1 wherein the configuration parameters comprise a URL containing media to be played and performance measurements to be collected.

22. The method of claim 1 further comprising sending schedule information to a schedule generator and receiving the schedule.

23. The method of claim 22 wherein the schedule information includes playback time.

24. The method of claim 1 wherein connecting a data acquisition agent to the network comprises utilizing a connection other than a dial-up connection.

25. A method of measuring performance of streaming media over a network, the method comprising:

connecting a data acquisition agent to the network;

receiving a list of measurement targets, associated configuration parameters, and schedule at the data acquisition agent;

sending a request for streaming media, based on the received list of measurement targets and schedule, from the data acquisition agent to a media source identified as one of the measurement targets connected to the network;

receiving streaming media from the measurement target in response to the request for media at the data acquisition agent;

monitoring the streaming media;

collecting performance measurements for the streaming media;

sending the performance measurements to a data collection server configured for collecting and storing data received from a plurality of data acquisition agents; and determining a stream quality rating based on the collected performance measurements, wherein the stream quality rating is calculated based on a percentage of a startup score, audio score, and video score.

26. The method of claim 25 wherein the video and audio scores are based on rendering and encoding scores.

27. The method of claim 26 wherein the rendering scores are based on relative packets and bandwidth.

28. The method of claim 26 wherein the encoding scores are based on bandwidth data.

29. A computer program product for measuring streaming media over a network, the product comprising:

computer code that connects a data acquisition agent to the network;

computer code that is configured for reading a received list of measurement targets at the data acquisition agent, associated configuration parameters, and schedule;

computer code that sends a request for streaming media, based on the received list of measurement targets and schedule, from the data acquisition agent to a media source connected to the network;

computer code that receives streaming media in response to the request for media at the data acquisition agent;

computer code that monitors the received streaming media;

computer code that collects performance measurements based on the received streaming media, said performance measurements comprising initial connection and redirection times;

computer code that sends the collected performance measurements to a data collection server configured for collecting and storing data received from a plurality of data acquisition agents; and a computer readable storage medium that stores said computer codes.

30. The computer product of claim 29 wherein the computer readable medium is selected from the group consisting of CD-ROM, floppy disk, tape, flash memory, system memory, hard drive, and a data signal embodied in a carrier wave.

31. A system for measuring performance of streaming media sent from a server over a network, the system comprising:

a preference delivery device operable to generate a list of measurement targets and associated configuration parameters;

a scheduler operable to generate a schedule based on data received for each of the measurement targets; and a data acquisition agent connected to the network and operable to receive the list of measurement targets, the configuration parameters associated with each of said measurement targets, and the schedule for requesting streaming media from each of said measurement targets; send a request for streaming media to the server, the agent configured to receive the streaming media, collect performance measurements based on the received streaming media, and send the collected performance measurements to a storage device, said performance measurements comprising initial connection and redirection times.

32. The system of claim 31 wherein the data acquisition agent includes a media player.

33. The system of claim 31 further comprising a data delivery system operable to receive data collected by the agent and store said data in a database.

34. The system of claim 31 wherein the performance measurements include a list of errors.

35. The system of claim 31 wherein the performance measurements comprise packet information.

36. The system of claim 31 wherein the performance measurements comprise frame information.

37. The system of claim 31 wherein the performance measurements comprise bandwidth information.

38. The system of claim 31 wherein the performance measurements comprise the codec used to encode a clip.

39. The system of claim 31 wherein the network is the Internet.

40. The system of claim 39 wherein the server is a Web server.

41. The system of claim 31 further comprising a plurality of data acquisition agents located in different geographic locations.

42. The system of claim 31 further comprising a processor configured to determine a stream quality rating based on the collected performance measurements.

43. The system of claim 42 wherein the stream quality rating is based on a startup score, audio score, and video score.

44. The system of claim 43 wherein the video and audio scores are based on rendering and encoding scores.

45. The system of claim 44 wherein the rendering scores are based on relative packets and bandwidth.

46. The system of claim 44 wherein the encoding scores are based on bandwidth data.

47. A system for measuring performance of streaming media sent from a server over a network, the system comprising:
a preference delivery device operable to generate a list of measurement targets and associated configuration parameters;
a scheduler operable to generate a schedule based on data received for each of the measurement targets; and
a data acquisition agent connected to the network and operable to receive the list of measurement targets, the configuration parameters associated with each of said measurement targets, and the schedule for requesting streaming media from each of said measurement targets; send a request for streaming media to the server, the agent being configured to receive the streaming media, collect performance measurements, and send the performance measurements to a storage device;
wherein the performance measurements comprise initial connection and redirection times.

48. A system for measuring performance of streaming media sent from a server over a network, the system comprising:
a preference delivery device operable to generate a list of measurement targets and associated configuration parameters;
a scheduler operable to generate a schedule based on data received for each of the measurement targets; and
a data acquisition agent connected to the network and operable to receive the list of measurement targets, the configuration parameters associated with each of said measurement targets, and the schedule for requesting streaming media from each of said measurement targets; send a request for streaming media to the server, the agent being configured to receive the streaming media, collect performance measurements, and send the performance measurements to a storage device;
wherein the performance measurements comprise number of redirects.

49. A system for measuring performance of streaming media sent from a server over a network, the system comprising
a preference delivery device operable to generate a list of measurement targets and associated configuration parameters;
a scheduler operable to generate a schedule based on data received for each of the measurement targets; and
a data acquisition agent connected to the network and operable to receive the list of measurement targets, the configuration parameters associated with each of said measurement targets, and the schedule for requesting streaming media from each of said measurement targets; send a request for streaming media to the server, the agent being configured to receive the streaming media, collect performance measurements, and send the performance measurements to a storage device;
wherein the performance measurements comprise rebuffer information.

50. A system for measuring performance of streaming media sent from a server over a network, the system comprising:
a preference delivery device operable to generate a list of measurement targets and associated configuration parameters;
a scheduler operable to generate a schedule based on data received for each of the measurement targets; and
a data acquisition agent connected to the network and operable to receive the list of measurement targets, the configuration parameters associated with each of said measurement targets, and the schedule for requesting streaming media from each of said measurement targets; send a request for streaming media to the server, the agent configured to receive the streaming media, collect performance measurements based on the received streaming media, and send the collected performance measurements to a storage device, wherein the agent is configured to at least temporarily store the collected performance measurements.

51. A system for measuring performance of streaming media sent from a server over a network, the system comprising:
a preference delivery device operable to generate a list of measurement targets and associated configuration parameters;
a scheduler operable to generate a schedule based on data received for each of the measurement targets, wherein the scheduler is in communication with the data acquisition agent and is configured to compute a schedule based on measurement interval, start time, and end time for each of the measurement targets; and a data acquisition agent connected to the network and operable to receive the list of measurement targets, the configuration parameters associated with each of said measurement targets, and the schedule for requesting streaming media from each of said measurement targets; send a request for streaming media to the server, the agent configured to receive the streaming media, collect performance measurements based on the received streaming media, and send the collected performance measurements to a storage device.

52. A method of measuring performance of streaming media over a network, the method comprising:

receiving at a data acquisition agent, a list of measurement targets, associated configuration parameters, and a schedule file;

sending a request for streaming media from the data acquisition agent to one of the measurement targets at a time specified in the schedule file;

receiving streaming media in response to the request for media at the data acquisition agent;

collecting performance measurements for the streaming media; and sending performance measurements to a storage device;

wherein the data acquisition agent is configured to at least temporarily store the collected performance measurements.

53. The method of claim 52 wherein receiving a schedule file comprises:

generating a measurement schedule at the data acquisition agent based on the list of measurement targets and associated configuration parameters;

sending the measurement schedule to a schedule generator; and receiving a schedule file from the schedule generator.

54. A method of measuring performance of streaming media over a network, the method comprising:

receiving at a data acquisition agent, a list of measurement targets, associated configuration parameters, and a schedule file;

sending a request for streaming media from the data acquisition agent to one of the measurement targets at a time specified in the schedule file;

receiving streaming media in response to the request for media at the data acquisition agent;

collecting performance measurements for the streaming media; and sending performance measurements to a storage device;

wherein the performance measurements comprise initial connection time, redirection time, and buffering time.

55. A method of measuring performance of streaming media over a network, the method comprising:

receiving at a data acquisition agent, a list of measurement targets, associated configuration parameters, and a schedule file;

sending a request for streaming media from the data acquisition agent to one of the measurement targets at a time specified in the schedule file;

receiving streaming media in response to the request for media at the data acquisition agent;

collecting performance measurements for the streaming media; and sending performance measurements to a storage device;

wherein the performance measurements comprise: average frames per second, average video and audio bandwidth, and encoding rate.

56. The A method of measuring performance of streaming media over a network, the method comprising:

receiving at a data acquisition agent, a list of measurement targets, associated configuration parameters, and a schedule file;

sending a request for streaming media from the data acquisition agent to one of the measurement targets at a time specified in the schedule file;

receiving streaming media in response to the request for media at the data acquisition agent;

collecting performance measurements for the streaming media;

sending performance measurements to a storage device; and calculating a stream quality rating based on a percentage of a startup score, audio score, and video score.

57. The method of claim 56 wherein the audio and video score account for encoding, delivery, and rendering factors.

* * * * *